United States Patent
Abe et al.

(10) Patent No.: US 10,146,431 B2
(45) Date of Patent: Dec. 4, 2018

(54) TOUCH PANEL DEVICE

(75) Inventors: Koichi Abe, Tokyo (JP); Shogo Tsubouchi, Tokyo (JP)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 54 days.

(21) Appl. No.: 12/737,878

(22) PCT Filed: Sep. 11, 2008

(86) PCT No.: PCT/JP2008/002512
§ 371 (c)(1),
(2), (4) Date: Feb. 25, 2011

(87) PCT Pub. No.: WO2010/029599
PCT Pub. Date: Mar. 18, 2010

(65) Prior Publication Data
US 2011/0148779 A1    Jun. 23, 2011

(51) Int. Cl.
*G06F 3/0488*    (2013.01)

(52) U.S. Cl.
CPC ............................. *G06F 3/04886* (2013.01)

(58) Field of Classification Search
CPC ...... G06F 3/041; G06F 3/0412; G06F 3/0418; G06F 3/044; G06F 3/0488–3/04886
USPC ........................... 345/156–184; 715/700–866
See application file for complete search history.

(56) References Cited

U.S. PATENT DOCUMENTS

| | | | |
|---|---|---|---|
| 5,784,060 A * | 7/1998 | Bertram et al. | 715/840 |
| 5,963,671 A * | 10/1999 | Comerford et al. | 382/230 |
| 6,103,979 A | 8/2000 | Motoyama et al. | |
| 6,727,892 B1 | 4/2004 | Murphy | |
| 7,126,587 B2 | 10/2006 | Kawakami et al. | |
| 7,372,454 B2 * | 5/2008 | Betts-LaCroix | 345/168 |
| 7,477,231 B2 | 1/2009 | Asai | |
| RE40,893 E * | 9/2009 | Engstrom | 400/613 |
| 7,800,592 B2 * | 9/2010 | Kerr et al. | 345/173 |

(Continued)

FOREIGN PATENT DOCUMENTS

| | | |
|---|---|---|
| CN | 1666170 | 9/2005 |
| GB | 2379635 | 3/2003 |

(Continued)

*Primary Examiner* — Roberto Flores
(74) *Attorney, Agent, or Firm* — Tutunjian & Bitetto, P.C.

(57) ABSTRACT

A touch panel device is provided which, even in cases in which a plurality of GUI parts are arranged in a limited space, enables operation of a GUI part in which, unlike a physical button, it is hard to distinguish the boundary by touch, without operational error, using a finger with a very large contact area in comparison to a touch pen. A touch panel device includes a rectangular screen having a detection region which detects contact, and a control section for generating a control signal in response to the contact detected by the detection region. The detection region has a shape that is inclined with respect to a side edge of the rectangular screen. In cases in which a body-part used for the contact is a finger of a user; when the user uses the right hand, the detection region has a shape that is inclined to the left side with respect to the side edge of the rectangular screen; and when the user uses the left hand, the detection region has a shape that is inclined to the right side with respect to the side edge of the rectangular screen.

16 Claims, 9 Drawing Sheets

(56) References Cited

U.S. PATENT DOCUMENTS

| | | | |
|---|---|---|---|
| 7,898,529 B2* | 3/2011 | Fitzmaurice et al. | 345/173 |
| 2003/0049066 A1* | 3/2003 | Cheng | 400/489 |
| 2005/0122313 A1* | 6/2005 | Ashby | 345/168 |
| 2005/0140661 A1* | 6/2005 | Collins | 345/173 |
| 2005/0162402 A1* | 7/2005 | Watanachote | 345/173 |
| 2005/0190970 A1* | 9/2005 | Griffin | 382/209 |
| 2005/0225538 A1* | 10/2005 | Verhaegh | 345/173 |
| 2005/0248525 A1 | 11/2005 | Asai | |
| 2005/0253816 A1* | 11/2005 | Himberg et al. | 345/173 |
| 2005/0286213 A1* | 12/2005 | Rooney | G06F 3/021 361/679.02 |
| 2006/0007178 A1* | 1/2006 | Davis | 345/173 |
| 2006/0053387 A1* | 3/2006 | Ording | 715/773 |
| 2006/0085757 A1* | 4/2006 | Andre et al. | 715/771 |
| 2006/0116203 A1* | 6/2006 | Nakada et al. | 463/30 |
| 2006/0132447 A1* | 6/2006 | Conrad | 345/168 |
| 2007/0097085 A1* | 5/2007 | Iwatsuki | 345/173 |
| 2007/0109276 A1* | 5/2007 | Kim et al. | 345/173 |
| 2007/0152976 A1 | 7/2007 | Townsend et al. | |
| 2007/0247442 A1* | 10/2007 | Andre et al. | 345/173 |
| 2009/0146957 A1* | 6/2009 | Lee et al. | 345/168 |
| 2009/0146960 A1* | 6/2009 | Gim | 345/172 |
| 2009/0237359 A1* | 9/2009 | Kim et al. | 345/168 |
| 2009/0237361 A1* | 9/2009 | Mosby et al. | 345/173 |

FOREIGN PATENT DOCUMENTS

| | | |
|---|---|---|
| JP | 06242866 | 9/1994 |
| JP | 0784692 | 3/1995 |
| JP | 08234882 | 9/1996 |
| JP | 2000066817 | 3/2000 |
| JP | 2004054589 | 2/2004 |
| JP | 2004189397 A2 | 7/2004 |
| JP | 2005284379 | 10/2005 |
| JP | 2005530235 | 10/2005 |
| JP | 2004341813 | 12/2015 |
| KR | 20050016691 | 2/2005 |
| WO | WO 02/073995 | 9/2002 |
| WO | WO03107168 | 12/2003 |
| WO | WO 2004/006080 | 1/2004 |
| WO | WO2004070604 A2 | 8/2004 |
| WO | WO2007071892 | 6/2007 |

* cited by examiner

TOUCH PANEL DEVICE

This application claims the benefit, under 35 U.S.C. § 365 of International Application PCT/JP2008/002512, filed Sep. 11, 2008, which was published in accordance with PCT Article 21(2) on Mar. 18, 2010 in English.

TECHNICAL FIELD

The present invention relates to a touch panel device, and more particularly, to a touch panel device for performing input using a finger.

BACKGROUND ART

Conventionally, in graphical user interfaces (referred to below as "GUI"), a plurality of GUI parts, such as buttons, boxes, and the like, for performing input to a computer, are often arranged in a limited space displayed on a screen. In such cases, since it is possible to dynamically change the arrangement of the GUI parts and good convenience is provided, an input device referred to as a touch panel or a touch screen is frequently used.

DISCLOSURE OF INVENTION

Problems to be Solved by the Invention

There are several problems with touch panels. Buttons on a touch panel are often operated using a touch pen, but in cases in which, after operating a dial or the like, without using the touch pen, and then operating the touch panel, changing to the touch pen diminishes comfortable operability. As a result, in order to realize a feeling of comfortable operability, there are cases in which it is required to directly perform an operation to the touch panel, and in particular to input to a button on the touch panel by a finger. However, for example in cases of inputting directly by a finger to a button on the touch panel, since the contact area of the finger tip is very large in comparison to the touch pen, and since distinguishing a boundary of the button by touch on the touch panel, unlike a physical button, is difficult, it is hard to know which portion of the finger is at a position that is in contact with the button and is performing input. From this situation, in cases in which input is directly performed by a finger to a button on the touch panel, if the button area is not enlarged, a mistaken operation can easily occur.

Furthermore, conversely to this, along with miniaturization of devices, there is a desire to make input parts compact, and inevitably there is a tendency for the touch panel itself to become smaller. As a result, in cases in which a plurality of buttons are necessary in a limited space, it has been necessary to use a touch pen, or to provide a multiple level (hierarchical) menu to decrease the number of buttons that operate at one time. However, even if a multiple level (hierarchical) menu is provided to decrease the number of buttons that operate at one time, due to moving between these multiple (hierarchical) levels, operation procedures become complicated, and in all cases a lowering of operability has been inevitable.

In order to improve the operability of buttons on the touch panel, for example, International Patent Application WO2004/070604 discloses a button having a circular shape, an elliptical shape, or a square shape, in accordance with a function of the button. Furthermore, Japanese Patent Application No. 2004-189397 discloses changing area in accordance with function and level of importance. However, even in cases in which these buttons are used and a plurality of GUI parts are arranged in a limited space, it is still difficult to operate, without a mistaken operation, a button in which, unlike a physical button, it is hard to distinguish the boundary by touch without operational error, using a finger which has a very large contact area in comparison to a touch pen. Therefore, the present invention takes into account the abovementioned problems and has as an object the provision of a touch panel device which, even in cases in which a plurality of GUI parts are arranged in a limited space, enables operation of a GUI part in which, unlike a physical button, it is hard to distinguish the boundary by touch, without operational error, using a finger which has a very large contact area in comparison to a touch pen.

Means for Solving the Problems

In accordance with a first aspect of the present invention, there is provided a touch panel device comprising: a rectangular screen having a detection region which detects contact; and a control section for generating a control signal in response to the contact detected by the detection region; wherein the detection region has a shape that is inclined with respect to a side edge of the rectangular screen.

In cases in which the user touches a touch panel with a part of his or her body such as a finger, contact surface of the body-part has a unique feature even if the contact area of the finger is very large in comparison with the touch pen. According to the present invention, since the detection region has a shape that is inclined with respect to a side edge of the rectangular screen, even in cases in which a plurality of GUI parts are arranged in a limited space, since the detection region of the GUI parts can be arranged in such a manner that this feature of the detection region is effectively utilized, it is possible to operate the GUI parts in which, unlike a physical button, it is hard to distinguish the boundaries by touch, without operational error, using a finger with a very large contact area in comparison to a touch pen.

Further, according to the present invention, a body-part used for the contact may be a finger of a user; when the user uses the right hand, the detection region may have a shape that is inclined (from upper left to lower right) to the left side with respect to the side edge of the rectangular screen; and when the user uses the left hand, the detection region may have a shape that is inclined (from upper right to lower left) to the right side with respect to the side edge of the rectangular screen.

When the user touches a touch panel with a finger of the hand, even though the contact area of the finger tip is larger than the touch pen, the surface of the contact with the touch panel has a unique feature, such as being inclined to the left when the user uses the right hand, being inclined to the right when the user uses the left hand, or the like. An experiment made by the inventor shows that the surface of contact with the touch panel is inclined to the left side at an angle of approximately 45 degrees (from upper left to lower right) with respect to perpendicular side edges of the screen when the right hand is naturally stretched, and the surface of contact with the touch panel is inclined to the right side at an angle of approximately 45 degrees when the left hand is naturally stretched. According to the present invention, since, when the user uses the right hand, the detection region has a shape that is inclined to the left side with respect to the side edge of the rectangular screen; and when the user uses the left hand, the detection region has a shape that is inclined to the right side with respect to the side edge of the rectangular screen, even in cases in which a plurality of GUI parts are arranged in a limited space, since the detection region of the GUI parts can be arranged in such a manner that this feature is effectively utilized, it is possible to operate GUI parts in which, unlike a physical button, it is hard to distinguish the boundaries by touch, without operational error, using a finger. The touch panel according to the present invention is user friendly since use of the touch panel will eliminate the need for the user to turn his or her arm around when performing input using the finger as in the conventional cases.

Further, according to the present invention, the rectangular screen may include a visible display region showing position of the detection region, and the display region may not be identical to the detection region.

According to the present invention, since the rectangular screen includes a visible display region showing the position of the detection region, and the display region is not identical to the detection region, various effects can be anticipated. For example, constituent members conventionally required for the detection areas can be economized on, the display region can be flexibly designed for the purpose of improving user convenience, or the like.

Further, according to the present invention, the rectangular screen may include a visible display region showing the position of the detection region, and the display region may be identical to the detection region.

According to the present invention, the rectangular screen includes a visible display region showing a position of the detection region, and the display region is identical to the detection region, thereby ensuring that the user can touch the desired detection region.

Further, according to the present invention, the touch panel device may further include an information input section for inputting information of the user; wherein the control section may set a shape of the detection region, based on the information of the user inputted by the information input section.

According to the present invention, since the touch panel device further includes an information input section for inputting information of the user, and the control section sets the shape of the detection region, based on the information of the user inputted by the information input section, a specification of the touch panel can be changed depending on whether the user touches the touch panel with a right hand finger or a left hand finger.

In accordance with a second aspect of the present invention, there is provided a touch panel device comprising: a rectangular screen having a plurality of detection regions each of which detects contact; and a control section for generating a control signal in response to the contact detected by any of the plurality of detection regions; wherein each of the plurality of detection regions has a shape that is inclined with respect to a side edge of the rectangular screen.

According to the present invention, since the touch panel device comprises: a rectangular screen having a plurality of detection regions each of which detects contact, a control section for generating a control signal in response to the contact detected by any of the plurality of detection regions, and each of the plurality of detection regions has a shape that is inclined with respect to a side edge of the rectangular screen, even in cases in which a plurality of GUI parts are arranged in a limited space, since the detection regions of the GUI parts can be arranged in such a manner that a feature of the part of the user's body in contact with the touch panel is effectively utilized, it is possible to operate GUI parts in which, unlike a physical button, it is hard to distinguish the boundaries by touch, without operational error, using a finger with a very large contact area in comparison to a touch pen.

Further, according to the present invention, since the plurality of detection regions are arranged to be mutually adjacent, on a straight line perpendicular to the side edge of the rectangular screen, and a part of a boundary that separates mutually adjacent detection regions has a shape that is inclined with respect to the side edge of the rectangular screen, corresponding to the body-part that the user uses in making contact, the detection regions of the GUI parts can be arranged in such a manner that the feature of the part of the user's body in contact with the touch panel is effectively utilized, and thus it is possible to operate GUI parts in which, unlike a physical button, it is hard to distinguish the boundaries by touch, without operational error, using a finger with a very large contact area in comparison to a touch pen.

According to the present invention, the boundary that separates the mutually adjacent detection regions may comprise: a first boundary section extending approximately parallel to the side edge of the rectangular screen; a second boundary section, corresponding to a body-part the user uses in making contact, inclined with respect to the side edge of the rectangular screen, and extending contiguously from the first boundary section; and a third boundary section extending contiguously from the second boundary section, approximately parallel to the first boundary section.

Further, according to the present invention, since the boundary that separates the mutually adjacent detection regions comprises a first boundary section extending approximately parallel to the side edge of the rectangular screen; a second boundary section, corresponding to a body-part the user uses in making contact, inclined with respect to the side edge of the rectangular screen, and extending contiguously from the first boundary section; and a third boundary section extending contiguously from the second boundary section, approximately parallel to the first boundary section, the detection regions of the GUI parts can be arranged in such a manner that the feature of the part of the user's body in contact with the touch panel is effectively utilized.

According to the present invention, in cases in which contact is detected at approximately the same time from two or more detection regions, among the plurality of detection regions, the control section may compute contact strength for detected contact in each of the two or more detection regions, and generate a control signal based on the contact detected from a detection region in which the contact strength for detected contact is largest. Here, the contact strength for detected contact in each of the two or more detection regions may include either of area of detection region in which contact is detected, or strength of contact pressure.

Further, according to the present invention, since in cases in which contact is detected at approximately the same time from two or more detection regions, among the plurality of detection regions, the control section may compute contact strength for detected contact in each of the two or more detection regions, and generate a control signal based on the contact detected from a detection region in which the contact strength for detected contact is largest, the detection region in which contact has been detected can be accurately determined even in cases in which, for reasons such as sensitivity of the detection regions being high, intervals between detection regions being small, or the like, there is a possibility that a detection occurs in which contact straddles two or more detection regions at approximately the same time.

EXPLANATION OF THE NUMERAL REFERENCES

Figure 1A:
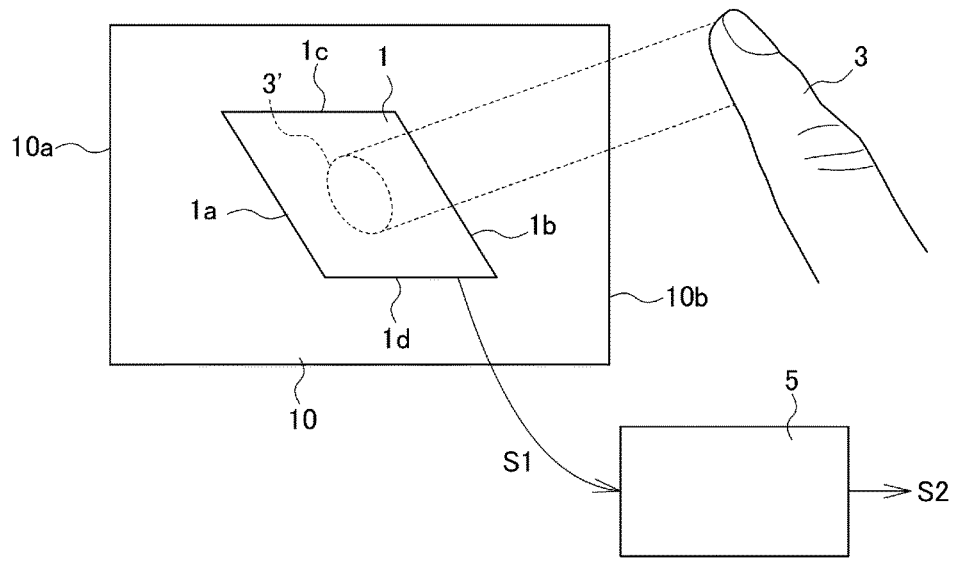
FIG. 1A is a view describing a screen, a detection region, and a control section forming a preferred embodiment of a touch panel device according to the present invention.

1 Detection region
2 Display region
5 Control section
10 Touch panel screen
10a, 10b Side edges
100 Information processing system
101 Image server
111 Controller
112 Key board
113 Mouse
135 System monitor
391 Controller controlling portion

DETAILED DESCRIPTION

The following describes a preferred embodiment according to the present invention with reference to the drawings.

First, a preferred embodiment of a touch panel device according to the present invention is described with reference to FIGS. 1A and 1B.

Referring to FIG. 1A, an outline of a detection region 1 of a GUI part provided on a rectangular screen 10 of a touch panel device is described. The detection region 1 for detecting contact has a shape that is inclined with respect to side edges 10a, 10b of the rectangular screen 10. In the present embodiment, it is assumed that a user uses the right hand, for ease of explanation. The detection region 1 has side edges 1a, 1b that are inclined (from upper left to lower right) with respect to the side edges 10a, 10b of the rectangular screen 10. In general, in cases in which the user touches the touch panel screen 10 with a right hand finger 3 (e.g., index finger), the surface of the finger 3 in contact with the touch panel screen 10, designated by a reference number 3', is elliptically shaped with a rising left incline (this means that the long sides of ellipse are inclined from upper left to lower right). The inventor focused his attention on this fact, and made the detection region 1 for detecting contact in a shape of an approximate parallelogram form, partially inclined corresponding to the finger of the user. In the present embodiment, the detection region 1 has a shape of an approximate parallelogram form inclined to the left side, since it is assumed that a user is using the right hand. In cases in which the user uses the left hand, the detection region 1 may have a shape of an approximate parallelogram form inclined to the right side. The detection region 1 of the touch panel screen 10 is adapted to output a detection signal S1 to a control section 5 when the contact is detected. The control section 5 is adapted to output a control signal S2 in response to the detection signal S1 to corresponding constituent part(s) (not shown). In the example shown in FIG. 1A, the detection region 1 is identical with a display region showing a position of the detection region. This means that boundary sections 1a, 1b, 1c, and 1d are identical with boundary sections of the display region.

Figure 1B:
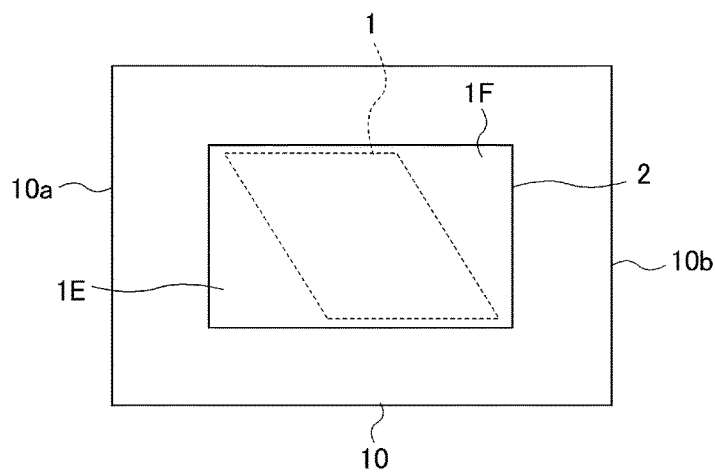
FIG. 1B is a view describing a screen, a detection region, and a display region forming the preferred embodiment of the touch panel device according to the present invention.

Referring to FIG. 1B, the display region 2 visible to the user is described, in addition to the rectangular screen 10 and the detection region 1. In the present example, the detection region 1 is not identical with the visible display region 2, which has a shape of an approximate rectangle form, unlike the example described with reference to FIG. 1A. If the visible display region 2 of the GUI part is made in the shape of a rectangular form as shown in FIG. 1B, the GUI part appears to be a rectangular button on the touch panel screen 10 to the user. The detection region may not be identical with the visible display region of the GUI part. However, it is preferable that the visible display region is made larger than the detection region in order to avoid operational error.

Since the contact surface of the touch panel screen 10 with the finger, in general, has a shape of an approximate elliptical form as described with reference to FIG. 1A, areas 1E, 1F within the display region 2 shown in FIG. 1B will most likely remain untouched. By making such areas, in which contact is not detected, within the display region 2, it is possible to avoid operational error caused by the neighboring detection region which has detected unintended contact. Further, by making the detection region for detecting contact not identical with the visible display region, various effects can be anticipated. For example, constituent members conventionally required for the detection areas can be economized on, the display region can be flexibly designed for the purpose of improving user convenience, or the like.

Figure 2:
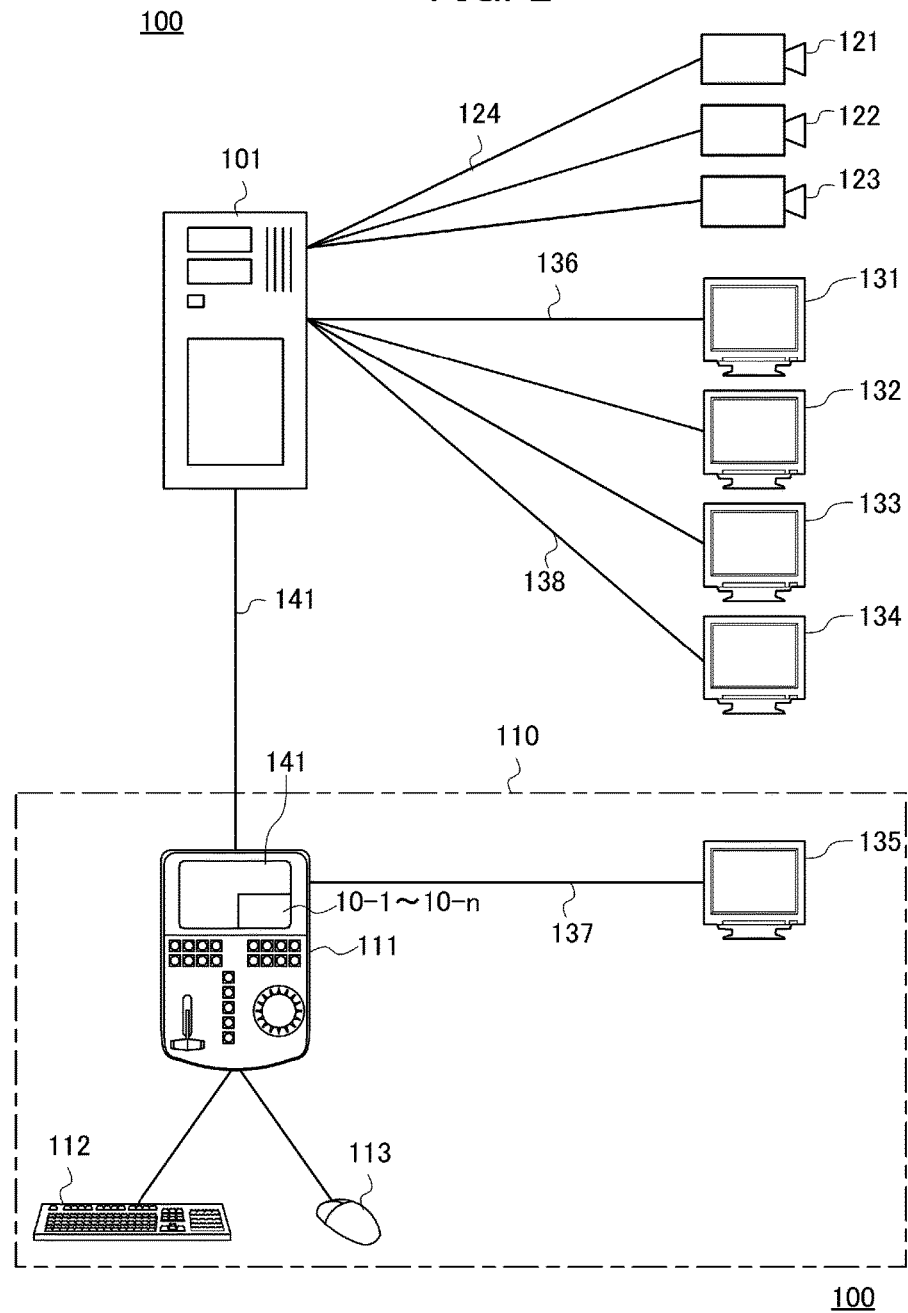
FIG. 2 is a schematic block diagram showing an information processing system including the preferred embodiment of the touch panel device according to the present invention.

FIG. 2 is a schematic block diagram showing an information processing system 100 including the preferred embodiment of the touch panel device 10 according to the present invention. The information processing system 100 may be, for example, a video editing and storage system. As shown in FIG. 2, the information processing system 100 is provided with an image server 101, a controller 111 having a touch panel device, a keyboard 112, a mouse 113, cameras 121 to 123, camera monitors 131 to 133, a decoder monitor 134, a system monitor 135, and the like. Each of the components forming the information processing system 100 is connected using, for example, a LAN (Local Area Network) 141 to connect the image server 101 and the controller 111, a coaxial cable 124 to connect the image server 101 and the cameras 121 to 123, a coaxial cable 136 to connect the image server 101 and the camera monitors 131 to 133, a cable 138 to connect the image server 101 and the decoder monitor 134, a cable 137 to connect the controller 111 and the system monitor 135, etc. However, the method of connection is not limited thereto, and may include any other wired or wireless connection methods as appropriate.

The image server 101 encodes the moving image signal received from the cameras 121 to 123, and stores the encoded signal as moving image data. Furthermore, the image server 101 decodes the moving image data into a moving image signal, and sends the moving image signal to the decoder monitor 134. The decoder monitor 134 displays moving images based on the moving image signal received from the image server 101. The camera monitors 131 to 133 display the moving images captured by the cameras 121 to 123. The term "moving image" herein used includes a "still image", as well.

The controller 111 sends and receives via the image server 101 and the LAN 141, and displays a user interface including GUI button group 10-1 to 10-n on the touch panel screen 10 (shown in FIG. 3), based on the signal sent from the image server 101 and the user input. Furthermore, the controller 111 converts user input that has been input by the keyboard 112, by the mouse 113 or by the touch panel device of the controller 111 to a signal, and sends the signal to the image server 101. In addition, the controller 111 sends the signal for displaying the user interface to the system monitor 135 via the cable 137.

Figure 3:
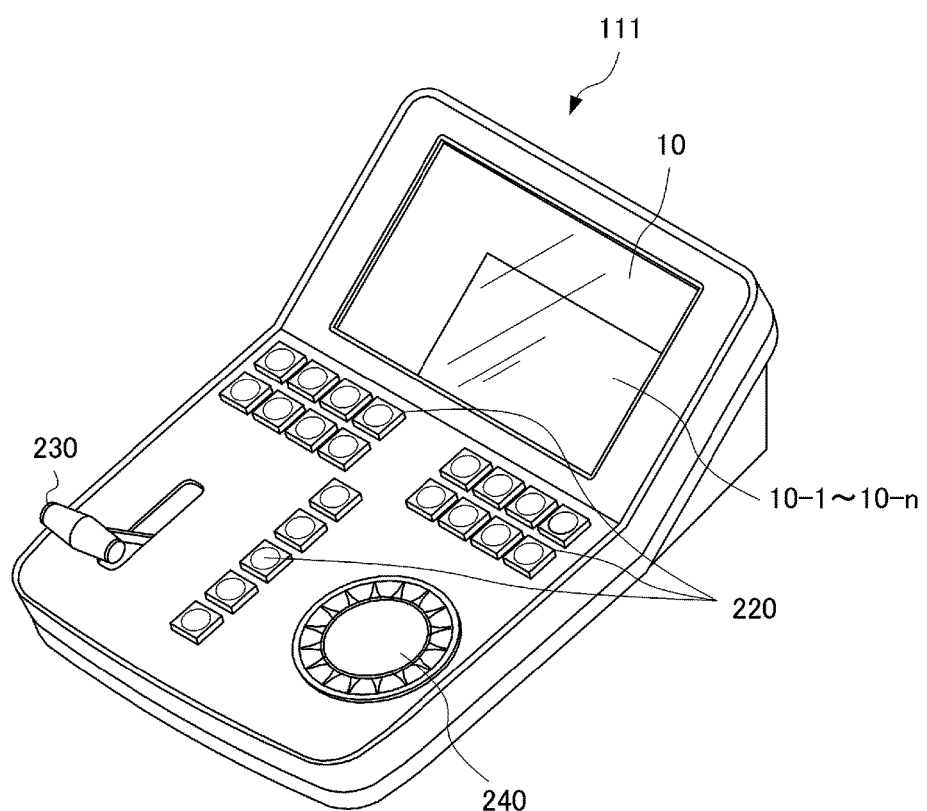
FIG. 3 is perspective view of the touch panel device.

FIG. 3 is a perspective view of the controller 111. As shown in FIGS. 3 and 2, the controller 111 is provided with a touch panel screen 10 on the upper portion thereof, button groups 220 arranged in respective arrays disposed in the central area below the touch panel screen 10, a T-bar 230 operated by a user by tilting in the forward or backward direction thereof, disposed in an area to the lower left below the touch panel screen 10, and a jog dial 240, which is disposed in an area to the lower right below the touch panel screen 10, operated by rotating horizontally.

The touch panel screen 10 displays the user interface including the GUI button group 10-1 to 10-n, corresponding to the signal and user input sent from the image server 101.

The T-bar 230 sends a signal to the image server 101 corresponding to the degree of tilt of a forwardly or backwardly tilting operation thereof by the user, and the replay speed of moving images to be reproduced, that is, the moving images that are to be displayed on the decoder monitor 134, is adjusted in accordance with the degree of tilt of the T-bar 230.

The jog dial 240 sends a signal to the image server 101 corresponding to the speed of rotation or angle thereof when the jog dial 240 has been operated by a user by being rotated horizontally.

Further, if the controller 111 is present, the keyboard 112, mouse 113, and system monitor 135 are not required in the information processing system 100, and may be omitted.

Figure 4:
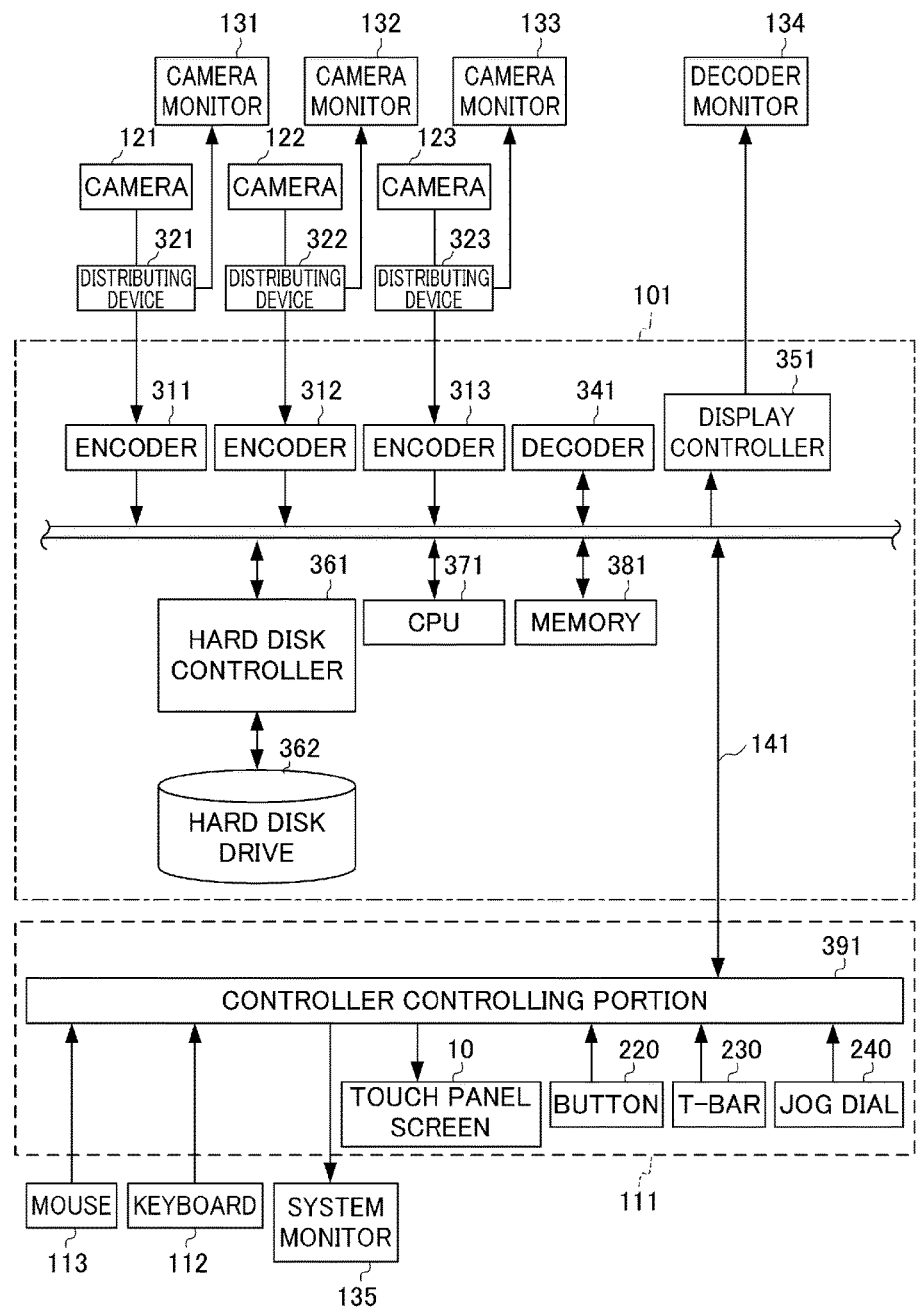
FIG. 4 is a block diagram of the information processing system.

FIG. 4 is a block diagram showing an overview of the information processing system including an embodiment of a touch panel device according to the present invention. As shown in FIGS. 1, 2 and 3, the information processing system 100 is provided with the image server 101, the controller 111, the keyboard 112, the mouse 113, the cameras 121 to 123, distributing devices 321 to 323, the camera monitors 131 to 133, the decoder monitor 134, the system monitor 135, and the like. It should be noted that the image server 101 and the controller 111 may be provided as a single integrated unit, although they are described as separate units.

The image server 101 is provided with encoders 311 to 313, a decoder 341, a display controller 351, a hard disk controller 361, a hard disk drive 362, a CPU 371, and a memory 381, each of which is connected to a bus via which communication therebetween is possible.

The encoders 311 to 313 encode the moving image signal sent from the distributing devices 321 to 323, and converts the signal to encoded moving image data. Furthermore, the encoders 311 to 313 may also read and encode a moving image signal stored in the hard disk drive 362.

The decoder 341 reads encoded moving image data from the hard disk drive 362, decodes the encoded moving image data and sends the moving image signal thus decoded to the display controller 351 or the like.

The hard disk drive 362 stores programs that are to be executed by the CPU 371, and encoded moving image data sent from the encoders 311 to 313. Furthermore, the hard disk drive 362 may be provided either within the image server 101, outside of the image server 101, or both within the image server 101 and outside of the image server 101.

The CPU 371 reads programs stored in the memory 381, and executes each type of processing in accordance with the programs contained therein. The programs executed by the CPU 371 include, for example, applications for editing or replaying moving image data, an OS (Operating System) for controlling each of the devices connected to the bus, and so on.

The memory 381 stores programs that have been read from the hard disk drive 362. The programs include, for example, applications for editing or playing back moving image data in response to input and output from the controller 111, and an OS for controlling each of the devices connected to the bus, and so on. Furthermore, the memory 381 may store the moving image signals and data from the devices connected to the bus.

The decoder monitor 134 is connected to the display controller 351, and displays moving images based on the moving image signal, such as a VGA signal, sent from the display controller 351. The decoder monitor 134 is used when the content of the moving image signal is to be monitored; however, it is not necessarily required in the configuration of the image processing system 100.

Furthermore, the controller 111 is provided with a controller controlling portion 391, a touch panel screen 10, button groups 220, a T-bar 230, and a jog dial 240. The controller controlling portion 391 constitutes the control section 5 described with reference to FIG. 1A.

The controller controlling portion 391 is provided with a CPU and memory. The controller controlling portion 391 sends to and receives from the image server 101 signals, sends a signal for displaying the user interface to the touch panel screen 10 and the system monitor 135, and sends input data received as input from the touch panel device 10 button group 220, the T-bar 230, the jog dial 240, the keyboard 112, and the mouse 113, and request commands to the image server 101. The controller controlling portion 391 controls the controller 111 to display the GUI button group 10-1 to 10-n on the touch panel screen 10 based on the user information inputted through the key board 112 or the mouse 113.

An example of the GUI button group 10-1 to 10-n thus displayed on the touch panel screen 10 is described with reference to FIGS. 5 and 6.

Figure 5A:
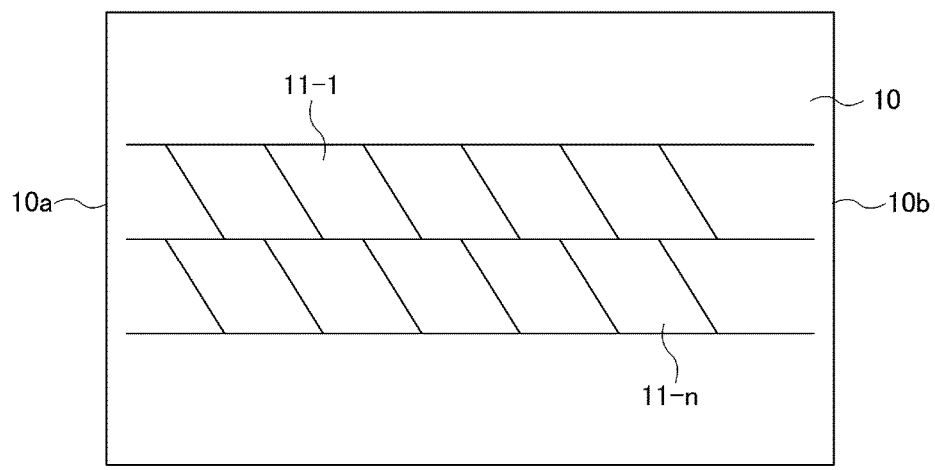
FIG. 5A is a view showing an example of detection regions for a right hand finger used for the touch panel device shown in FIG. 3.
Figure 5B:
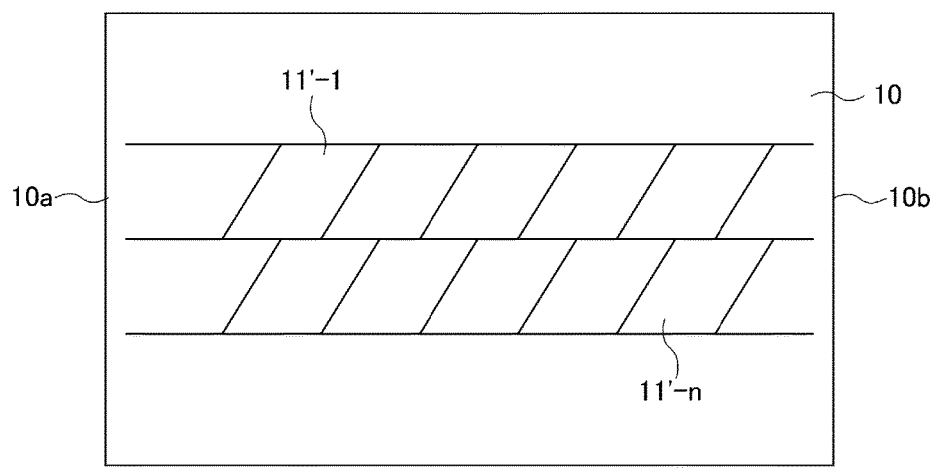
FIG. 5B is a view showing an example of detection regions for a left hand finger used for the touch panel device shown in FIG. 3.

As an example of a plurality of detection regions corresponding to the GUI button group 10-1 to 10-n, FIG. 5A shows detection regions 11-1 to 11-*n* for a right hand finger each with a rising left incline (from upper left to lower right) with respect to side edges 10*a* and 10*b* of a rectangular screen, generated by the controller controlling portion 391 for the GUI button group 10-1 to 10-*n*, based on user information to the effect that the user is using a finger of the right hand. The detection regions 11-1 to 11-*n* are arranged to be mutually adjacent, on straight lines perpendicular to the side edges 10*a* and 10*b* of the rectangular touch panel screen 10. Conversely to this, FIG. 5B shows detection regions 11'-1 to 11'-*n* for a left hand finger each with a rising right incline with respect to the side edges 10*a* and 10*b* of the rectangular screen, generated by the controller controlling portion 391 for the GUI button group 10-1 to 10-*n*, based on user information to the effect that the user is using a finger of the left hand. In the same way, the detection regions 11'-1 to 11'-*n* are arranged to be mutually adjacent, on straight lines perpendicular to the side edges 10*a* and 10*b* of the rectangular touch panel screen 10.

Figure 6:
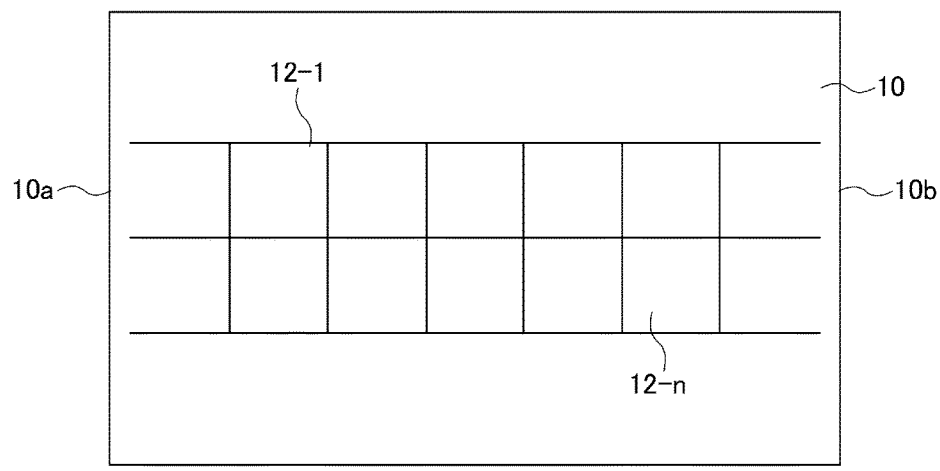
FIG. 6 is a view showing an example of display regions displayed on the touch panel device shown in FIG. 3.

As shown in FIG. 6, each of the GUI button group 10-1 to 10-*n* may have a visible display region 12-1 to 12-*n* not identical to the detection region 11-1 to 11-*n*. In the embodiment of FIG. 6, the display regions are 12-1 to 12-*n*, but the detection regions may be 11-1 to 11-*n* or 11'1 to 11'-*n* of FIG. 5A or FIG. 5B. That is, the fact that the detection regions are different from the display regions is a feature of the present example.

Furthermore, according to the present invention, the shape of the detection regions is not limited to the approximate parallelograms shown in FIG. 1B, FIG. 5A, or FIG. 5B, and, as described referring to FIG. 1A, as long as a face 3' of an elliptical shape, inclined to correspond to a finger of a hand used by the user, can be ensured, any shape may be used. For example, if the detection regions of the GUI button group 10-1 to 10-*n* can ensure the elliptically shaped face 3' described referring to FIG. 1A, only a portion of the boundary that separates detection regions may have a shape inclined with respect to a body-part used by the user for contact. In this way, by having the detection regions approach the elliptically shaped face 3' described referring to FIG. 1A, the area of the detection regions in the touch panel screen 10 can be utilized even more effectively.

Figure 7A:
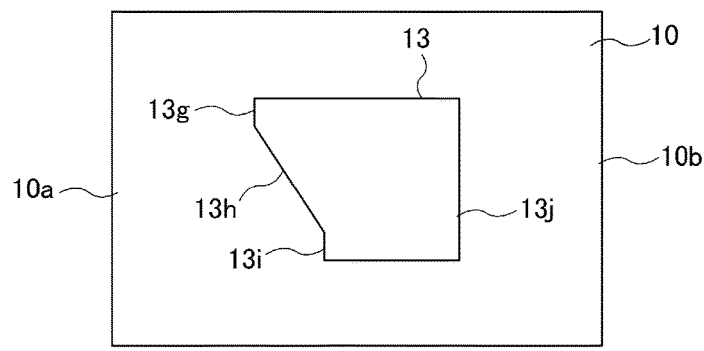
FIG. 7A is a view showing an example of a detection region used for the touch panel device shown in FIG. 3.
Figure 7B:
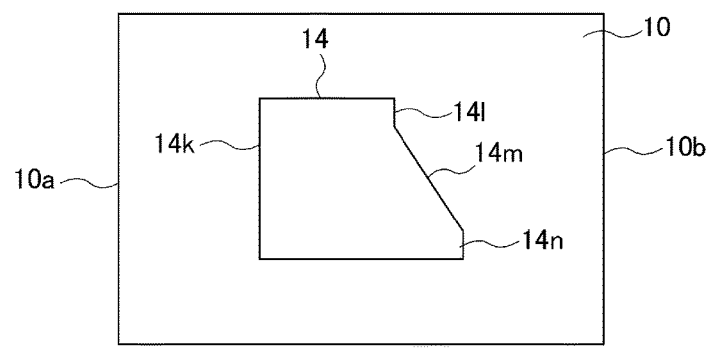
FIG. 7B is a view showing another example of a detection region used for the touch panel device shown in FIG. 3.

Specifically, as shown in FIG. 7A, only a portion 13*h*, which is a part of a left side boundary, corresponding to the user's finger, may be inclined with respect the side edges 10*a* and 10*b* of the rectangular screen, and other boundary sections 13*g*, 13*i*, and 13*j* may extend approximately parallel to the side edges 10*a* and 10*b* of the rectangular screen. Or, as shown in FIG. 7B, only a portion 14*m*, which is a part of a right side boundary, corresponding to the user's finger, may be inclined with respect the side edges 10*a* and 10*b* of the rectangular screen, and other boundary sections 14*k*, 14*l*, and 14*m* may extend approximately parallel to the side edges 10*a* and 10*b* of the rectangular screen. The embodiment shown in FIG. 7A and FIG. 7B assumes that the user is using a finger of the right hand, but in cases in which the user uses a finger of the left hand, the detection region 13 of FIG. 7A and the detection region 14 of FIG. 7B may be reversed between right and left.

Figure 8:
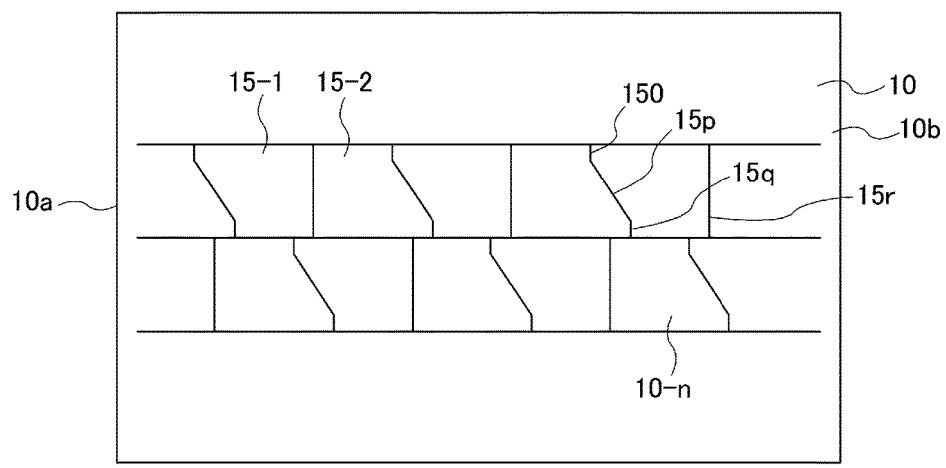
FIG. 8 is a view showing an example of a plurality of detection regions used for the touch panel device shown in FIG. 3.

FIG. 8 shows an example of detection regions of a GUI button group 10-1 to 10-*n*, including a plurality of these types of detection regions. As shown in FIG. 8, each of the detection regions 15-1 to 15-*n* includes a first boundary section 15*o* in which a boundary that separates mutually adjacent detection regions extends approximately parallel to the side edges 10*a* and 10*b* of the rectangular screen, a second boundary section 15*p*, corresponding to a body-part the user uses in making contact, inclined with respect to the side edges 10*a* and 10*b* of the rectangular screen, and extending contiguously from the first boundary section 15*o*, and a third boundary section 15*q* extending contiguously from the second boundary section 15*p*, approximately parallel to the first boundary section 15*o*. In the detection regions 15-1 to 15-*n* shown in FIG. 8, a boundary 15*r* on a side opposite to the boundaries 15*o*, 15*p*, and 15*q*, that form an S-shape, extends approximately parallel to the side edges 10*a* and 10*b* of the rectangular screen, but the boundary 15*r* on this opposite side may also be formed in an S-shape similar to the boundaries 15*o*, 15*p*, and 15*q*; the first boundary section 15*o* and the third boundary section 15*q* extend approximately parallel to the side edges 10*a* and 10*b* of the rectangular screen, but the present invention is not limited thereto, and as long as the arrangement is such that the elliptically shaped face 3' which is inclined in correspondence with a finger of a hand used by the user, as described referring to FIG. 1A, can be ensured, the boundary sections may be inclined with respect to the side edges 10*a* and 10*b* of the rectangular screen, or may be curved. In the same way, the first boundary section 15*o*, the second boundary section 15*p*, and the third boundary section 15*q* may be formed in a curve, not a straight line. In the present embodiment, it is possible to realize the GUI with improved operability, while having an area the same as for cases in which squares are simply lined up.

Figure 9:
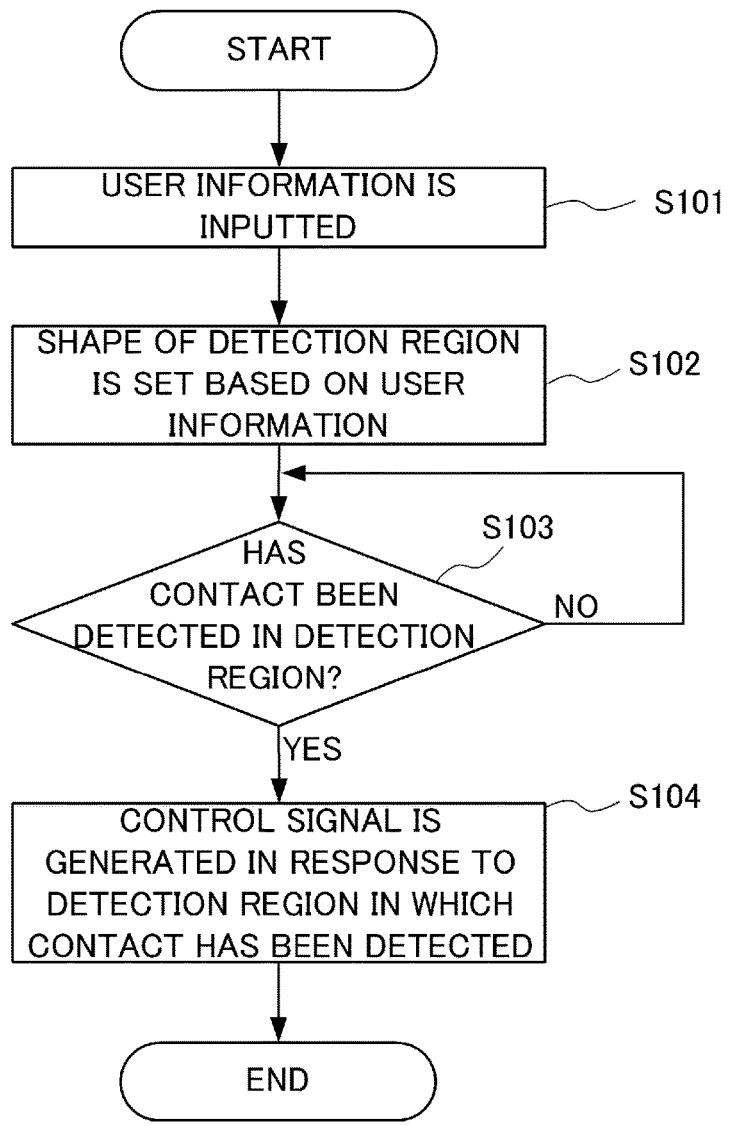
FIG. 9 is a flow chart describing an operation carried out by the touch panel device shown in FIG. 3.

Next, operation of the controller 111 formed in this way is described, referring to FIG. 9.

FIG. 9 is a flow chart describing an example of operation of the controller 111 that has a touch panel screen controlled and executed by the controller controlling portion 391.

Referring to FIG. 9, first, in step S101, the controller controlling portion 391 inputs user information which the user has inputted by operating the keyboard 112 or the mouse 113. However, since Japanese people are overwhelmingly right-handed, step S101 may be omitted and right handedness assumed. Next, in step S102, the controller controlling portion 391 sets the shape of the detection regions based on the user information (in cases in which S101 is omitted, the default is set to the right hand). Specifically, in cases in which user information to the effect that the user is using a finger of the right hand, is inputted, detection regions of a shape inclined to the left side, for example, the shape of 11-1 to 11-*n* shown in FIG. 5A, are set. Conversely to this, in cases in which user information to the effect that the user is using a finger of the left hand, is inputted, the detection regions of a shape inclined to the right side, for example, 11'-1 to 11'-*n* shown in FIG. 5B, are set.

In step S103, the controller controlling portion 391 judges whether or not contact has been detected at any of the detection regions 11-1 to 11-*n*, based on whether or not the detection signal S1 has been detected. If in step S103 it is judged that contact has been detected, in step S104 the controller controlling portion 391 generates a control signal S2 in response to the detection region in which contact has been detected, and transmits the signal to the controller 111 main unit.

Various systems such as a resistive film system, a capacitance system, or the like, may be used for the touch panel screen 10. In general the touch panel screen 10 is arranged such that "contact" is detected by a detection region that is first to be touched when a finger approaches the detection region or comes within a prescribed distance. However, a description is given concerning cases in which, for reasons such as sensitivity of the detection regions being high, intervals between detection regions being small, or the like, there is a possibility that a detection occurs in which contact straddles two or more detection regions at approximately the same time.

In cases in which contact is detected at approximately the same time from two or more detection regions among a plurality of detection regions, the controller controlling portion 391 may compute contact strength for detected contact in each of the two or more detection regions, and may generate a control signal based on contact detected in a detection region in which contact strength for detected contact is largest. The contact strength for detected contact in each of the two or more detection regions may include either of area of detection region in which contact is detected, or strength of contact pressure.

A description will be given referring to FIG. 10 concerning an example of operation of the controller 111 in cases in which there is a possibility of detecting contact at approximately the same time from two or more detection regions.

Figure 10:
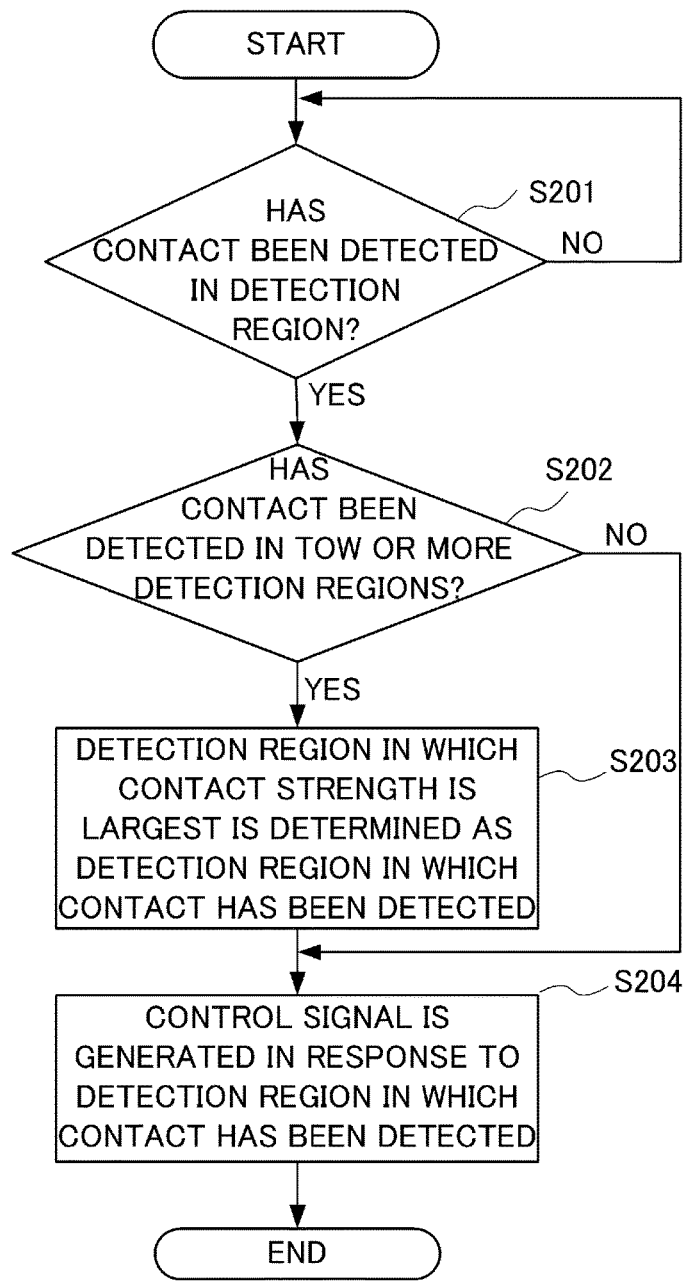
FIG. 10 is a flow chart describing an operation carried out by the touch panel device shown in FIG. 3, in cases in which there is a possibility of contact being detected at approximately the same time from two or more detection regions.

FIG. 10 is a flow chart describing an example of operation of the controller 111 in cases in which contact is detected at approximately the same time from two or more detection regions, controlled and executed by the controller controlling portion 391.

Referring to FIG. 10, first, in step S201, the controller controlling portion 391 judges whether or not contact has been detected at any of the detection regions 11-1 to 11-$n$, based on whether or not the detection signal S1, outputted from the detection regions 11-1 to 11-$n$, has been detected. If, in step S210, it is judged that contact has been detected, in step S202, the controller controlling portion 391 judges whether or not contact has been detected in two or more detection regions. In step S202 in cases in which it is judged that contact has been detected in two or more detection regions, control proceeds to step S203, and if not, control proceeds to step S201.

In step S203, the controller controlling portion 391 determines a detection region in which the contact strength is largest, as a detection region in which contact has been detected. Specifically, a determination is made, as a detection region in which contact has been detected, of the detection region in which the contact strength is largest, including, for example, either of the area of the detection region in which contact has been detected, or the strength of the contact pressure, based on the detection signal S1 inputted from two or more detection regions. In step S204, the controller controlling portion 391 generates the control signal S2 corresponding to the detection region in which contact has been detected.

As described above, the touch panel device according to the present invention includes the rectangular screen having the detection regions for detecting contact, and the control section for generating the control signal in response to contact detected in a detection region; since the detection regions have a shape that is inclined with respect to side edges of the rectangular screen, even in cases in which a plurality of GUI parts are arranged in a limited space, since it is possible to effectively utilize the detection regions, it is possible to operate GUI parts in which, unlike a physical button, it is hard to distinguish the boundaries by touch, without operational error, using a finger with a very large contact area in comparison to a touch pen. Furthermore, in the abovementioned embodiment it has been described that a specification of the GUI button group in the touch panel can be changed to right hand finger usage or left hand finger usage, based on the user information, but the specification of the GUI button group in the touch panel may be fixed to the right hand finger usage or the left hand finger usage at shipping time. Furthermore, the inclination of the detection regions has been described with side edges of the rectangular touch panel as reference, but in cases in which the touch panel screen is not rectangular, the inclination of the detection regions may have as reference a median plane of the user assumed when the touch panel screen is being operated.

The embodiment of the present invention has been described above, but the present invention is not limited to the abovementioned embodiment. Furthermore, effects described in the embodiment of the present invention merely list most preferable effects generated by the invention, and effects of the present invention are not limited to those described in the embodiment examples of the invention.

For example, the touch panel device according to the present invention can be applied, in addition to application software for computers using graphical user interfaces, to any device that has a graphical user interface and graphical user interface functionality, such as game machines, mobile telephones, personal digital assistants (PDA), memory audio, game machines, intelligent home appliances, televisions, car navigation systems, security systems, bank ATMs, automatic vending machines, copiers, fax machines, touch panel input devices and the like, and can be applied to GUI parts and to various GUI parts such as, not only GUI buttons, but also boxes, icons, toolbars, and the like. Furthermore, with regard to body-parts in contact with the touch panel, it is clear that not only fingers of the hand, but any part of the body, supportive device, or the like, according to the needs of the user, can be used.

Furthermore, arrangements exist in which various operation principles are utilized in the touch panel device, but the invention of the present application can be applied to any operation principle thereof. For example, operation principles or systems for the touch panel include a matrix switch system, a resistive film system, a surface acoustic wave system, an infrared system, an electromagnetic induction system, a capacitance system, and the like.

The invention claimed is:

1. A touch panel device comprising:
   a rectangular screen including a detection region for a button on the screen and a respective visible display region for indicating a position of the detection region, the detection region being smaller than, and completely inside, the respective visible display region and having an area greater than an area of a detected contact in the detection region; and
   a control section for setting a parallelogram shape of the detection region for the button for generating a control signal in response to the contact detected in the detection region, said control signal indicating a corresponding input;
   wherein the parallelogram shape of the detection region has a top boundary, a bottom boundary, a right boundary, and a left boundary, with the top and bottom boundaries being parallel to one another and to a boundary of the visible display region and the left and right boundaries being parallel to one another and inclined with respect to a side edge of the rectangular screen and the visible display region, the inclination being determined based on a hand configuration setting associated with a hand used to contact the detection region, the hand configuration setting being based on user input regarding handedness preferences or a default hand configuration setting; and
   wherein the visible display region is not identical to the detection region and comprises a non-detection region.

2. The touch panel device according to claim 1, wherein:
when the hand configuration setting is a right hand configuration, the detection region has a parallelogram shape that is inclined to the left side with respect to the side edge of the rectangular screen; and
when the hand configuration setting is a left hand configuration, the detection region has a parallelogram shape that is inclined to the right side with respect to the side edge of the rectangular screen.

3. The touch panel device according to claim 1, wherein the default hand configuration setting is a right hand configuration.

4. The touch panel device according to claim 1, wherein the hand configuration setting is stored by the control section.

5. The touch panel device according to claim 1, wherein the control section is configured to set the parallelogram shape of the detection region by changing a direction of inclination of at least one side edge.

6. The touch panel device according to claim 1, wherein the left and right boundaries are inclined with respect to the side edge of the visible display region at an angle of about 45°.

7. A method for processing input, comprising:
configuring a detection region on a screen by setting a parallelogram shape of the detection region, wherein the parallelogram shape of the detection region has a top boundary, a bottom boundary, a right boundary, and a left boundary, with the top and bottom boundaries being parallel to one another and to a boundary of a visible display region and with the left and right boundaries being parallel to one another and inclined with respect to a side edge of the rectangular screen and the visible display region, the inclination being determined based on a hand configuration setting associated with a hand used to contact the detection region, the hand configuration setting being based on user input regarding handedness preferences or a default hand configuration setting;
the visible display region indicating a position of the detection region, wherein the visible display region is not identical to the detection region and comprises a non-detection region, and wherein the detection region is smaller than and completely inside the visible display region and has an area greater than an area of a detected contact in the detection region;
detecting contact in the detection region; and
generating a control signal in response to the contact detected in the detection region, said control signal indicating a corresponding input.

8. The method according to claim 7, wherein:
when the hand configuration setting is a right hand configuration, the detection region has a parallelogram shape that is inclined to the left side with respect to the side edge of the rectangular screen; and
when the hand configuration setting is a left hand configuration, the detection region has a parallelogram shape that is inclined to the right side with respect to the side edge of the rectangular screen.

9. The method according to claim 7, wherein the default hand configuration setting is a right hand configuration.

10. The method according to claim 7, wherein the parallelogram shape of the detection region is set by changing a direction of inclination of at least one side edge.

11. The method according to claim 7, wherein the left and right boundaries are inclined with respect to the side edge of the visible display region at an angle of about 45.

12. A touch panel device, comprising:
a rectangular screen including a detection region for a button on the screen and a respective visible display region for indicating a position of the detection region, the detection region being smaller than, and completely inside, the respective visible display region and having an area greater than an area of a detected contact in the detection region;
a user interface comprising a plurality of hardware buttons, a T-bar, a jog dial, and keyboard configured to accept user input regarding handedness preferences; and
a control section for setting a parallelogram shape of the detection region for the button based on the user input and for generating a control signal in response to the contact detected in the detection region, said control signal indicating a corresponding input;
wherein the parallelogram shape of the detection region has a top boundary, a bottom boundary, a right boundary, and a left boundary, with the top and bottom boundaries being parallel to one another and to a boundary of the visible display region and the left and right boundaries being parallel to one another and inclined with respect to a side edge of the rectangular screen and the visible display region, the inclination being determined based on a hand configuration setting associated with a hand used to contact the detection region, the hand configuration setting being based on the user input regarding handedness preferences or a default hand configuration setting; and
wherein the visible display region is not identical to the detection region and comprises a non-detection region.

13. The touch panel device according to claim 12, wherein the default hand configuration setting is a right hand configuration.

14. The touch panel device according to claim 12, wherein the parallelogram shape of the detection region is set by changing a direction of inclination of at least one side edge.

15. The touch panel device according to claim 12, wherein the left and right boundaries are inclined with respect to the side edge of the visible display region at an angle of about 45°.

16. The touch panel device according to claim 12, wherein:
when the hand configuration setting is a right hand configuration, the detection region has a parallelogram shape that is inclined to the left side with respect to the side edge of the rectangular screen; and
when the hand configuration setting is a left hand configuration, the detection region has a parallelogram shape that is inclined to the right side with respect to the side edge of the rectangular screen.

* * * * *